(12) United States Patent
Eisenberg et al.

(10) Patent No.: US 7,511,601 B2
(45) Date of Patent: Mar. 31, 2009

(54) RADIO FREQUENCY IDENTIFICATION IN DOCUMENT MANAGEMENT

(75) Inventors: Peter M. Eisenberg, Minneapolis, MN (US); David P. Erickson, Stillwater, MN (US); Edward D. Goff, Mahtomedi, MN (US); Mitchell B. Grunes, Minneapolis, MN (US); Gene J. Hickok, Cottage Grove, MN (US); Janet T. Keller, Eagan, MN (US); William J. Kelliher, Jr., Lino Lakes, MN (US); Jon A. Kirschhoffer, White Bear Lake, MN (US); John M. Kruse, Minneapolis, MN (US); Diane E. Morel, Shoreview, MN (US); Scott D. Pearson, Woodbury, MN (US); Chester Piotrowski, White Bear Lake, MN (US); Edmund J. Ring, Circle Pines, MN (US); Robert A. Sainati, Bloomington, MN (US); Michele A. Waldner, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1192 days.

(21) Appl. No.: 10/153,124

(22) Filed: May 20, 2002

(65) Prior Publication Data

US 2002/0196126 A1 Dec. 26, 2002

Related U.S. Application Data

(63) Continuation-in-part of application No. 09/874,749, filed on Jun. 5, 2001, now abandoned.

(51) Int. Cl.
*H04Q 5/22* (2006.01)

(52) U.S. Cl. ............... 340/3.51; 340/825.49; 340/10.1; 340/10.2; 340/10.32; 340/572.1

(58) Field of Classification Search ............... 340/3.51, 340/10.1, 10.32, 572.1, 10.2, 825.49
See application file for complete search history.

(56) References Cited

U.S. PATENT DOCUMENTS

| 3,750,167 A | 7/1973 | Gehman et al. |
| 4,219,296 A | 8/1980 | Fujii et al. ............ 414/273 |
| 4,376,936 A | 3/1983 | Kott ................... 340/825 |
| 4,457,016 A | 6/1984 | Pfeffer ................ 382/59 |

(Continued)

FOREIGN PATENT DOCUMENTS

CN 1265215 6/2000

(Continued)

OTHER PUBLICATIONS

Herdeen, Frederick et al.; "Get a lock on inventory"; Security Management; Arlington; Oct. 1996 (6 pgs.).

(Continued)

*Primary Examiner*—Edwin C Holloway, III
(74) *Attorney, Agent, or Firm*—Melissa E. Buss

(57) ABSTRACT

Various systems and methods of handling items such as files are disclosed, including systems and methods for polling RFID-tagged items while they are stored in storage areas.

13 Claims, 4 Drawing Sheets

U.S. PATENT DOCUMENTS

| | | | |
|---|---|---|---|
| 4,636,634 A | 1/1987 | Harper et al. | 250/223 |
| 4,636,950 A | 1/1987 | Caswell et al. | 364/403 |
| 4,658,357 A | 4/1987 | Carroll et al. | |
| 4,688,026 A | 8/1987 | Scribner et al. | 340/572 |
| 4,814,742 A | 3/1989 | Morita et al. | |
| 4,829,297 A * | 5/1989 | Ilg et al. | 370/449 |
| 4,835,372 A | 5/1989 | Gombrich et al. | 235/375 |
| 4,862,160 A | 8/1989 | Ekchian et al. | 340/825 |
| 4,870,391 A | 9/1989 | Cooper | |
| 4,879,756 A | 11/1989 | Stevens et al. | 455/39 |
| 4,924,219 A | 5/1990 | Sato | 340/825 |
| 4,952,928 A | 8/1990 | Carroll et al. | |
| 4,973,086 A | 11/1990 | Donnelly et al. | 283/37 |
| 5,063,380 A | 11/1991 | Wakura | 340/825 |
| 5,151,684 A | 9/1992 | Johnsen | 340/572 |
| 5,164,985 A * | 11/1992 | Nysen et al. | 380/271 |
| 5,204,670 A | 4/1993 | Stinton | |
| 5,231,273 A | 7/1993 | Caswell et al. | |
| 5,276,431 A | 1/1994 | Piccoli et al. | |
| 5,287,414 A | 2/1994 | Foster | 382/1 |
| 5,288,980 A | 2/1994 | Patel et al. | 235/381 |
| 5,327,115 A | 7/1994 | Swierczek | 340/309 |
| 5,334,822 A | 8/1994 | Sanford | 235/385 |
| 5,339,074 A * | 8/1994 | Shindley et al. | 340/5.28 |
| 5,369,699 A | 11/1994 | Page et al. | |
| 5,389,919 A | 2/1995 | Warren et al. | 340/825 |
| 5,424,858 A | 6/1995 | Gillotte | 359/143 |
| 5,426,284 A | 6/1995 | Doyle | 235/385 |
| 5,434,775 A | 7/1995 | Sims et al. | 364/403 |
| 5,450,070 A | 9/1995 | Massar et al. | 340/825 |
| 5,455,410 A | 10/1995 | Schneider | 235/385 |
| 5,459,657 A | 10/1995 | Wynn et al. | |
| 5,493,392 A | 2/1996 | Cramer et al. | |
| 5,537,105 A | 7/1996 | Marsh et al. | 340/825 |
| 5,541,585 A | 7/1996 | Duhame et al. | 340/825 |
| 5,581,707 A | 12/1996 | Kuecken | |
| 5,610,596 A | 3/1997 | Petitclerc | 340/825 |
| 5,635,693 A | 6/1997 | Benson et al. | 235/384 |
| 5,651,548 A | 7/1997 | French et al. | |
| 5,682,142 A | 10/1997 | Loosmore et al. | 340/572 |
| 5,686,902 A * | 11/1997 | Reis et al. | 340/10.2 |
| 5,689,238 A | 11/1997 | Cannon, Jr. et al. | 340/568 |
| 5,708,423 A | 1/1998 | Ghaffari et al. | 340/825 |
| 5,717,867 A | 2/1998 | Wynn et al. | |
| 5,739,765 A | 4/1998 | Stanfield et al. | 340/825 |
| 5,745,036 A | 4/1998 | Clare | 340/572 |
| 5,751,221 A | 5/1998 | Stanfield et al. | 340/825 |
| 5,771,003 A | 6/1998 | Seymour | |
| 5,785,181 A | 7/1998 | Quartararo, Jr. | |
| 5,794,213 A | 8/1998 | Markman | |
| 5,798,693 A | 8/1998 | Engellenner | 340/505 |
| 5,799,302 A | 8/1998 | Johnson et al. | |
| 5,804,810 A | 9/1998 | Woolley et al. | 235/492 |
| 5,814,797 A | 9/1998 | Rifkin | |
| 5,886,634 A * | 3/1999 | Muhme | 340/572.1 |
| 5,887,176 A | 3/1999 | Griffith et al. | |
| 5,920,261 A | 7/1999 | Hughes et al. | |
| 5,929,780 A | 7/1999 | Pagnol et al. | |
| 5,936,527 A | 8/1999 | Isaacman et al. | 340/572 |
| 5,963,134 A | 10/1999 | Bowers et al. | |
| 5,991,742 A | 11/1999 | Tran | |
| 5,995,017 A | 11/1999 | Marsh et al. | 340/825 |
| 6,025,780 A | 2/2000 | Bowers et al. | |
| 6,075,441 A | 6/2000 | Maloney | 340/568 |
| 6,078,258 A | 6/2000 | Auerbach et al. | |
| 6,100,804 A | 8/2000 | Brady et al. | 340/572 |
| 6,127,928 A | 10/2000 | Issacman et al. | 340/572 |
| 6,137,411 A | 10/2000 | Tyren | 340/572 |
| 6,137,928 A | 10/2000 | Issacman et al. | 340/572 |
| 6,141,649 A | 10/2000 | Bull | |
| 6,154,137 A | 11/2000 | Goff et al. | 340/572 |
| 6,173,900 B1 | 1/2001 | Yoshigi et al. | |
| 6,195,006 B1 | 2/2001 | Bowers et al. | |
| 6,204,764 B1 | 3/2001 | Maloney | 340/568 |
| 6,232,870 B1 | 5/2001 | Garber et al. | 340/10 |
| 6,232,876 B1 | 5/2001 | Maloney | |
| 6,240,091 B1 | 5/2001 | Ginzboorg et al. | |
| 6,260,049 B1 | 7/2001 | Fitzgerald et al. | |
| 6,318,636 B1 | 11/2001 | Reynolds et al. | |
| 6,324,437 B1 | 11/2001 | Frankel et al. | |
| 6,330,971 B1 | 12/2001 | Mabry et al. | |
| 6,335,686 B1 | 1/2002 | Goff et al. | 340/572.4 |
| 6,354,493 B1 | 3/2002 | Mon | |
| 6,400,997 B1 | 6/2002 | Rapp, III | |
| 6,411,211 B1 | 6/2002 | Boley et al. | |
| 6,496,806 B1 | 12/2002 | Horwitz et al. | |
| 6,608,551 B1 * | 8/2003 | Anderson et al. | 340/10.51 |
| 6,714,121 B1 | 3/2004 | Moore | |
| 6,744,367 B1 | 6/2004 | Forster | |
| 6,774,782 B2 * | 8/2004 | Runyon et al. | 340/505 |
| 6,888,509 B2 | 5/2005 | Atherton | |
| 7,069,100 B2 | 6/2006 | Monette et al. | |
| 2001/0000019 A1 | 3/2001 | Bowers et al. | |
| 2001/0000958 A1 | 5/2001 | Ulrich et al. | |
| 2002/0041234 A1 | 4/2002 | Kuzma et al. | |
| 2002/0104013 A1 | 8/2002 | Ghazarian | |
| 2002/0111819 A1 | 8/2002 | Li et al. | |

FOREIGN PATENT DOCUMENTS

| | | |
|---|---|---|
| DE | 198 56 762 | 5/2000 |
| DE | 198 56 763 | 6/2000 |
| DE | 200 13 622 U1 | 7/2000 |
| EP | 0 357 309 | 3/1990 |
| EP | 0 740 262 A2 | 10/1996 |
| EP | 0 794 507 A2 | 9/1997 |
| EP | 0 944 085 A2 | 9/1999 |
| EP | 0 997 842 | 5/2000 |
| EP | 1 033 675 A | 9/2000 |
| EP | 1 033 675 A2 | 9/2000 |
| EP | 1 139 278 A2 | 10/2001 |
| GB | 2 288 299 | 10/1995 |
| JP | 56-110193 | 9/1981 |
| JP | 7-110874 A | 4/1995 |
| JP | 7-325870 A | 12/1995 |
| JP | 10-024686 | 1/1998 |
| JP | 10-181261 | 7/1998 |
| JP | 00-154673 | 9/1998 |
| JP | 11-39522 | 2/1999 |
| JP | 2001-028510 | 1/2001 |
| JP | 2001-216546 A | 8/2001 |
| WO | WO 89/04016 | 5/1989 |
| WO | WO 94/22580 | 10/1994 |
| WO | WO 98/13800 | 4/1998 |
| WO | WO 98/16849 | 4/1998 |
| WO | WO 98/27670 | 6/1998 |
| WO | WO 98/59258 | 12/1998 |
| WO | WO 99/05660 | 2/1999 |
| WO | WO 99/10839 | 3/1999 |
| WO | WO 99/64974 | 12/1999 |
| WO | WO 00/10112 | 2/2000 |
| WO | WO 00/10122 | 2/2000 |
| WO | WO 00/10144 | 2/2000 |
| WO | WO 00/16280 | 3/2000 |
| WO | WO 00/43805 | 7/2000 |
| WO | WO 00/65532 | 11/2000 |
| WO | WO 00/77704 A2 | 12/2000 |
| WO | WO 01/03058 | 1/2001 |
| WO | WO 01/03058 A1 | 1/2001 |
| WO | WO 01/90849 A2 | 11/2001 |

OTHER PUBLICATIONS

Jeff Hedlund et al.; "SmartBookcase" (2 pgs.) dated Sep. 13, 2001.

"VTLS RFID Solution" from VTLS Inc. Web site (2 pgs.) dated Sep. 13, 2001.

Article entitled "Never lose a file again" Findentity® RF in cooperation with X-ident, Texas Instruments and Leitz (6 pgs.).

Finkenzeller; "RFID Handbook—Radio Frequency Identification Fundamentals and Applications"; 1999; pp. 227-273.

* cited by examiner

RADIO FREQUENCY IDENTIFICATION IN DOCUMENT MANAGEMENT

This application is a continuation-in-part of U.S. Ser. No. 09/874,749, filed Jun. 5, 2001, now abandoned.

GOVERNMENT LICENSE RIGHTS

This invention was made with Government support under Agreement No. NMA202-97-9-1050 awarded by the National Imagery and Mapping Agency. The Government has certain rights in the invention.

TECHNICAL FIELD

The present invention relates to document management and file management, and specifically the use of radio frequency identification systems for document and file management.

BACKGROUND OF THE INVENTION

At least two patent publications describe the use of radio frequency identification (RFID) systems for document or file management. One is U.S. Pat. No. 5,689,238 (Cannon, Jr. et al.), which according to its abstract describes methods and systems for locating objects using electronic tags that are attached to the object before it is stored. To locate the object, the response code associated with the tag on that object is entered into an interrogator, and the interrogator sends a signal that causes the tag to emit a sound, or a signal.

Another publication is PCT published application WO 00/16280, and specifically at page 23, line 11 through page 24, line 5. That portion of the PCT publication references a filing cabinet having drawers, each of which stores file folders. The file folders may be provided with an RFID tag. In use, a controller sequentially polls antennae in the drawers of the filing cabinet. The controller detects response signals or codes, and thus can determine which files are in the drawers.

The present invention is related to improvements in fields of this type.

SUMMARY OF THE INVENTION

A number of embodiments of the present invention are described herein, some of which are summarized below. This listing is not intended to be limiting, or representative of the claims, but simply illustrative.

In a first embodiment of the invention, a method is provided for minimizing interactions between overlapping RFID tags, wherein the method comprises the step of intentionally staggering the location of RFID tags on consecutive items to which RFID tags are applied. In a second embodiment of the invention, a method is provided for minimizing interactions between overlapping RFID tags, wherein the method comprises the steps of (a) determining an order in which items are to be placed in a storage area; and (b) intentionally staggering the location of RFID tags on consecutive items in the order. In a third embodiment of the invention, a method is provided for minimizing interactions between overlapping RFID tags, wherein the method comprises the steps of (a) applying RFID tags to items; (b) providing information in a database that is indicative of the location of the RFID tag on the item; and (c) using the information to select successive items for a storage area so that instances of overlapping RFID tags are minimized.

In a fourth embodiment of the invention, a guide is provided for positioning successive RFID tags on successive items, wherein the guide includes an indication of more than one position at which an RFID tag may be located relative to the item, so that an RFID tag may be applied to each successive item in a position different from the previous item. In a fifth embodiment of the invention, a method is provided for minimizing interactions between RFID tags, wherein the method comprises the step of providing a guide that includes an indication of more than one location at which an RFID tag can be located on an item.

In a sixth embodiment of the invention, an RFID tag is provided, comprising an RFID element including an integrated circuit and an antenna, a substrate, and a repositionable adhesive that enables the RFID tag to be attached to a surface, detached from the surface, and reattached to a surface. In a seventh embodiment of the invention, a repositionable tag is provided for mounting on a file folder, comprising, (a) an RFID tag; and (b) a support for the RFID tag. In an eighth embodiment of the invention, a file folder is provided comprising an RFID tag that can be repositioned at different locations on the file folder to minimize interactions between the RFID tag and another RFID tag.

In a ninth embodiment of the invention, a method is provided for minimizing interactions between RFID tags associated with adjacent items, the method comprising the step of providing a surface on which the items rest, the surface including structures that position each successive item at a different vertical position than the previous item. In a tenth embodiment of the invention, the ninth embodiment of the invention includes a surface that is a shelf, and items that are files, and the structures position each successive file at a different vertical position than adjacent files. In an eleventh embodiment of the invention, a method is provided for minimizing interactions between RFID tags associated with adjacent items, the method comprising the steps of (a) providing a surface adjacent the items; and (b) providing a structure that positions each successive item at a different horizontal position than the previous item. In a twelfth embodiment of the invention, the eleventh embodiment of the invention includes items that are files, and the files are supported by shelves. In a thirteenth embodiment of the invention, a file folder is provided comprising an RFID tag, the file folder including a spacer for maintaining a predetermined minimum thickness in the area of the RFID tag so as to minimize interactions between the RFID tag and another RFID tag.

In a fourteenth embodiment of the invention, an RFID tag is provided including a light source that can be activated when the RFID tag is interrogated. In a fifteenth embodiment of the invention, a method is provided for identifying an item that is associated with an RFID tag, the method comprising the steps of (a) interrogating the RFID tag; and (b) illuminating a light source associated with at least one of the item and the RFID tag to indicate that the RFID tag has been interrogated by an RFID reader. In a sixteenth embodiment of the invention, the item of the fifteenth embodiment of the invention is at least one of (a) misplaced; (b) identified on a list of items available to an RFID reader that interrogates the RFID tag; (c) a candidate for archiving or destruction; and (d) adjacent to a misplaced item.

In a seventeenth embodiment of the invention, a method is provided for determining a desired location for an item, the method comprising the steps of (a) identifying an item adjacent to the desired location, the item being associated with an RFID tag; (b) interrogating the RFID tag; and (c) illuminating a light source associated with the RFID tag to indicate that the desired location is adjacent to the item. In an eighteenth embodiment of the invention, a storage area is provided, comprising (a) a desired location for an item; (b) an item bearing an RFID tag, wherein a light source is associated with at least one of the item and the RFID tag, the RFID-tagged item being adjacent to the desired location.

In a nineteenth embodiment of the invention, a system is provided for locating an item of interest within a container that holds other items, the item of interest and the container each including an RFID tag, wherein a light source is associated with the container whereby the light source may be illuminated when the RFID tag associated with either the item of interest, the container, or both is interrogated by an RFID reader. In a twentieth embodiment of the invention, at least one of the item of interest and the container of the nineteenth embodiment of the invention is (a) misplaced; (b) identified on a list of items available to an RFID reader that interrogates the RFID tag; (c) a candidate for archiving or destruction; and (d) adjacent to a misplaced item.

In a twenty-first embodiment of the invention, a method is provided for interrogating a storage area that includes a number of items each bearing an RFID tag, the method comprising the step of polling designated portions of the storage area more frequently than other portions of the storage area. In a twenty-second embodiment of the invention, the method of the twenty-first embodiment of the invention further includes automatically polling designated portions of the storage area more frequently than other portions of the storage area based on information determined from polling. In a twenty-third embodiment of the invention, the frequency of the polling of the method of the twenty-first embodiment of the invention depends on the number of items that have been removed from or returned to the storage area. In a twenty-fourth embodiment of the invention, the frequency of polling of the twenty-first embodiment of the invention depends on the number of people who have used the designated portions of the storage area.

In a twenty-fifth embodiment of the invention, a method is provided for interrogating a storage area that includes a number of items each bearing an RFID tag, the method comprising the steps of (a) providing a polling schedule for polling the RFID tags; and (b) preempting the polling schedule to poll a designated portion of the storage area, prior to polling the RFID tags according to the polling schedule. In a twenty-sixth embodiment of the invention, a method is provided for interrogating a storage area that includes items each bearing an RFID tag, the method comprising the steps of (a) providing a polling schedule for polling the RFID tags; and (b) providing a user interface associated with the RFID polling system that enables a user to alter the polling schedule by increasing or decreasing the number of times that a portion of the storage area is polled relative to other portions of the storage area.

In a twenty-seventh embodiment of the invention, an RFID polling system is provided, comprising (a) an antenna system for polling RFID tags associated with items stored in a storage area; (b) a controller for controlling which portion(s) of the storage area are polled; (c) a polling schedule that designates the order in which portions of the storage area are polled; and (d) a user interface that enables a user to alter the polling schedule by increasing or decreasing the number of times that a portion of the storage area is polled relative to other portions of the storage area. In a twenty-eighth embodiment of the invention, an RFID polling system is provided, comprising (a) an antenna system for polling RFID tags associated with items stored in a storage area; (b) a controller for controlling which portion(s) of the storage area are polled; (c) a polling schedule that designates the order in which portions of the storage area are polled; and (d) a detection system that detects activity in portions of the storage area, whereby the polling schedule is altered based on information provided by the detection system. In a twenty-ninth embodiment of the invention, the alteration in the polling schedule of the twenty-eighth embodiment of the invention is proportional to the activity detected.

In a thirtieth embodiment of the invention, a method is provided for polling RFID-tagged items, comprising the steps of (a) providing a list of items for a user to locate; and (b) polling the last-known locations for the items on the list prior to the user searching for the items. In a thirty-first embodiment of the invention, a method is provided for interrogating a storage area that includes items each bearing an RFID tag, the method comprising the steps of (a) providing a polling schedule for polling the RFID tags; (b) monitoring portions of the storage area to detect activity; and (c) altering the polling schedule based on the activity detected. In a thirty-second embodiment of the invention, a method is provided for polling RFID tags associated with items in a storage area, the method comprising the steps of (a) providing a database including information identifying the current location of each item within the storage area; and (b) updating the database using information from polling the storage area for items being removed or replaced. In a thirty-third embodiment of the invention, the entire storage area of the thirty-second embodiment of the invention is polled periodically to obtain a census of every RFID-tagged item in the storage area.

In a thirty-fourth embodiment of the invention, a method is provided for locating the approximate position of an item bearing an RFID tag within a storage area, comprising the steps of (a) providing an antenna on each side of the item, the antennas being adapted to interrogate the RFID tag; (b) interrogating the RFID tag using both antennas; and (c) identifying that the item is located closer to one of the antennas if only that antenna is able to interrogate the item successfully, and identifying that the item is located approximately in the center of the two antennas if each antenna is able to interrogate the item successfully. In a thirty-fifth embodiment of the invention, a storage area is provided, comprising (a) an antenna shelf tape for interrogating RFID tags associated with items stored in the storage area; and (b) at least one light source within the storage area, the light source adapted to be illuminated when an RFID tag located in proximity to the light source is interrogated.

In a thirty-sixth embodiment of the invention, a system is provided for tracking items associated with RFID tags, comprising (a) a check-out station for interrogating an RFID tag, and for updating a database to indicate that the item has been checked-out; and (b) a timer for tracking the amount of time for which the item has been checked-out. In a thirty-seventh embodiment of the invention, the system of the thirty-sixth embodiment of the invention further comprises (c) a notification system for sending a notification if the amount of time that an item has been checked-out exceeds a predetermined amount of time. In a thirty-eighth embodiment of the invention, the notification of the thirty-seventh embodiment of the invention is by e-mail. In a thirty-ninth embodiment of the invention, the e-mail of the thirty-eighth embodiment of the invention is sent to a person who checked the item out.

In a fortieth embodiment of the invention, a system is provided for RFID-tagged items, comprising (a) a storage area for RFID-tagged items, the storage area including an RFID reader for detecting the presence of RFID-tagged items; and (b) a notification system for notifying a user that at least one RFID-tagged item is in the storage area and awaiting the user's action. In a forty-first embodiment of the invention, an RFID system is provided, comprising (a) an antenna system for transmitting write command signals to RFID tags; (b) a storage location for storing items of interest, each of which includes an RFID tag; and (c) an RFID writer in operative connection to the antenna system, wherein the RFID writer is adapted to write identical information to each RFID tag within range of an antenna to which a write command signal is directed.

In a forty-second embodiment of the invention, a container system is provided, comprising (a) a container for holding a plurality of items each associated with a bar-code; (b) an RFID tag associated with the container; and (c) a database entry associating the RFID tag with the items. In a forty-third embodiment of the invention, a container system is provided, comprising (a) a container for holding a plurality of items each associated with a bar-code; (b) an RFID tag associated with the container; and (c) information stored within a memory on the RFID tag that is sufficient to identify the bar-codes.

In a forty-fourth embodiment of the invention, a method is provided for associating items that are each associated with a barcode with a single RFID tag, comprising the step of creating an entry in a database associating the bar-coded items with the single RFID tag. In a forty-fifth embodiment of the invention, the method of the forty-fourth embodiment of the invention comprises scanning each barcode with a barcode scanner, and associating the barcode with the single RFID tag in a database.

In a forty-sixth embodiment of the invention, a method is provided for associating items that are each associated with a barcode with a single RFID tag, comprising the step of writing to the memory of the RFID tag information sufficient to identify the barcodes. In a forty-seventh embodiment of the invention, the method of the forty-sixth embodiment of the invention comprises scanning each barcode with a barcode scanner, and associating the barcode with the single RFID tag in the memory of the RFID tag.

In a forty-eighth embodiment of the invention, the use of an RFID-based tracking system in a medical facility is disclosed, wherein (a) patient files each include an RFID tag; (b) a patient file storage location includes an RFID reader that is connected to a database, for checking files into and out of the storage location and updating the database accordingly; and (c) at least one office in which a patient file is used includes an RFID reader for detecting the presence of the file, the reader being connected to the database to provide current information regarding the location of the file.

In a forty-ninth embodiment of the invention, the use of an RFID-based tracking system in a legal office is disclosed, wherein (a) client files each include an RFID tag; (b) a client file storage location includes an RFID reader that is connected to a database, for checking files into and out of the storage location and updating the database accordingly; and (c) at least one office in which a client file is used includes an RFID reader for detecting the presence of the file, the reader being connected to the database to provide current information regarding the location of the file.

In a fiftieth embodiment of the invention, the use of a portable RFID reader in combination with a storage area including a polling system for polling RFID-tagged items is disclosed, wherein information from the polling system is provided to the portable RFID reader to enable a user to locate an RFID-tagged item. In a fifty-first embodiment of the invention, the use of a portable RFID reader for checking items into or out of inventory, or both, is disclosed, wherein a user interrogates an RFID tag associated with the item, and provides information to the portable RFID reader, using a user interface associated with the RFID reader, to indicate whether the item is being checked into or out of inventory. In a fifty-second embodiment of the invention, a method is provided for checking items into or out of inventory, comprising the steps of (a) providing a mobile storage area including an associated RFID tag; (b) associating at least two RFID-tagged items with the RFID-tagged mobile storage area; and (c) checking the items into or out of inventory by interrogating the RFID tag associated with the mobile storage area, and not interrogating the RFID-tagged items. In a fifty-third embodiment of the invention, the fifty-second embodiment of the invention is modified by checking the items into or out of inventory by a method other than interrogation of an RFID tag associated with the mobile storage area.

Other aspects of the present invention are described below. The foregoing descriptions are intended to be exemplary, and not limiting of the scope of the claims.

DESCRIPTION OF THE DRAWINGS

The present invention will be described with reference to the attached FIGS. 1 through 10, in which.

DETAILED DESCRIPTION OF THE INVENTION

Figure 1:
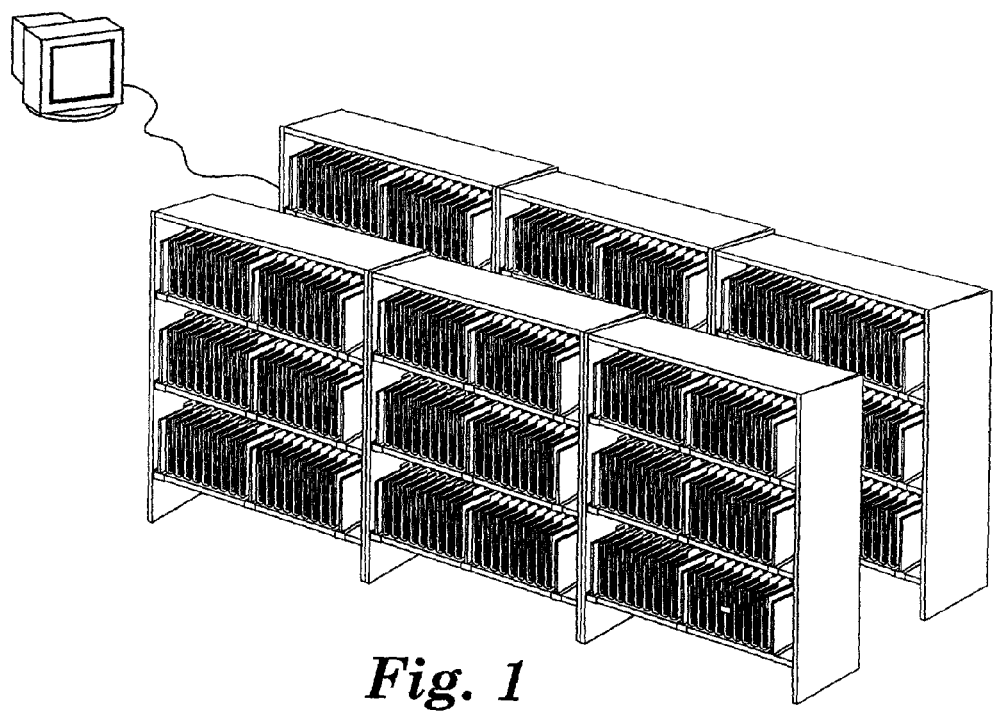
FIG. 1 is an elevated front perspective view of a file tracking system according to the present invention.
Figure 2:
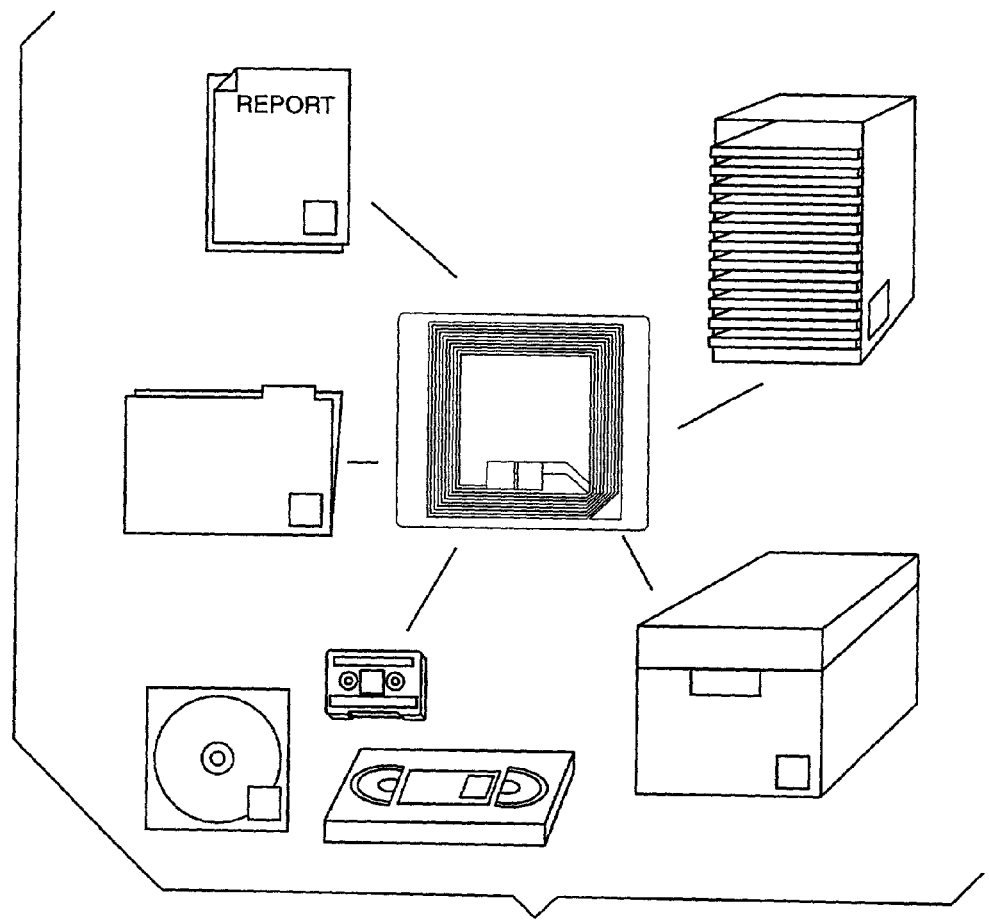
FIG. 2 is a representation of an RFID tag and certain objects to which it can be attached for use with the present invention.

Despite some interest in converting offices to paperless environments in which paper documents are entirely replaced by electronic versions of those documents, a number of industries continue to rely heavily on paper documents. Examples include law offices, government agencies, and facilities for storing business, criminal, and medical records. Although in some instances these records are stored in enclosed filing cabinets, in many cases the files are positioned on open shelves of the type shown in FIG. 1. Documents and files can also be found in other locations, including on desks and tables, in drawers, on carts, or stacked on the floor. Although the various aspects of the present invention will largely be described in the context of files or documents or both, the invention as shown in FIG. 2 may be used in tracking other items including books, video tapes, optically-recorded media, or retail items, pallets, containers, or other assets, as appropriate, whether or not each of these items is specifically called out as an alternative application.

Various aspects of the present invention will be described beneath certain headings below, but persons of ordinary skill in the art will immediately recognize that certain features described in one part of this description may be used in conjunction with features in other parts of this description, and thus the headings are intended to be a helpful guide, not a limiting boundary.

Use of the electromagnetic spectrum is regulated internationally by the International Telephone Union and in the United States by the Federal Communications Commission. These entities have assigned different parts of the electromagnetic spectrum to different uses, with one identified use being for Industrial, Scientific and Medical (ISM) applications. If a system operates within a frequency range assigned to that category of application, as well as within certain power and signal strength limitations and interference and frequency tolerances, that system may operate without license. If a system operates outside of the frequency range assigned for devices of the type represented by the system, either a license for operation must be obtained from the governing body, or the system will be restricted to operation at a severely reduced signal output level.

The present invention, which relates specifically to the use of radio frequency identification (RFID) systems in document and file management, is subject to the regulations described above. One of the assigned frequencies for ISM applications, which applies to RFID, is 13.56 MHz, with an allowable frequency variance of +/−7 kHz. Though other assigned frequencies exist for RFID applications and would work for the subject invention, 13.56 MHz is preferred for the subject invention because it allows for short to medium read range, is potentially inexpensive and provides for a medium reading speed.

I. Smart Labels or Tags

RFID tags or labels are made by various manufacturers including Texas Instruments of Dallas Tex., under the designation "Tag-it". Another type of RFID tag is actually a combination tag that includes an RFID element and a magnetic security element, and is described in U.S. Pat. No. 6,154,137, which is assigned to the assignee of the present invention, the contents of which is incorporated by reference herein. An RFID tag typically includes an integrated circuit with a certain amount of memory, a portion of which may be used by the manufacturer to write certain information to the tag (and perhaps lock it to protect it from being changed or overwritten), and another portion of which may be used by a purchaser to store additional information to the tag. The integrated circuit is operatively connected to an antenna, as also shown in FIG. 2, that receives RF energy from a source and also backscatters RF energy in a manner well known in the art. It is this backscattered RF energy that provides a signal that may be received by an interrogator or reader to obtain information about the RFID tag, and the item with which it is associated. RFID tags may operate in one or more different frequency ranges, such as the Tag-it RFID tags sold by Texas Instruments, which operate at 13.56 MHz.

RFID tags may be associated with or applied to items of interest, as described above. The tag may even be embedded within the item or the packaging of the item so that the tag is at least substantially imperceptible, which can help to prevent detection and tampering. Thus it would be possible to "source-mark" items with an RFID tag, such as inserting an RFID tag into or applying an RFID tag to an item during its manufacture, as with a book, compact disc, consumer product, file folder, pallet, carton, box-sealing tape, shipping label, or the like.

In many file rooms, color-coded file folders are used to help users organize records. Colors may be used for categories or sorting. An RFID element could be embedded or added to the color-coded label. A separate color could, for example, be used to indicate that a file has been converted, meaning that an RFID tag or label has been attached to it, so that a user can quickly determine which files are still awaiting conversion and which have already been converted. If a folder were sold with embedded RFID capability, the memory on the RFID tag could be pre-programmed to include the color-coding information.

One potential difficulty in tagging items with RFID tags can occur when the items are very thin, or more specifically when the RFID tags are overlapping and in approximately parallel planes. For example, file rooms such as those shown in FIG. 1 may include thick files containing many papers, but may also contain thin files that are empty or contain only a small number of papers. If individual pages are tagged with RFID tags, then those tags also may overlap when, for example, the papers are stacked in a pile or collected in a file. When RFID tags overlap, they can become difficult to interrogate (or read) reliably with an RFID interrogator (or reader). This may be referred to herein as a "tag-tag interaction" problem. Without wishing to be bound by any particular scientific theory regarding the cause of that difficulty, it is believed that two RFID tags that overlap each other may cause a shift in the tuned resonating frequency of the antennas of each tag. When the resonating frequency of the antenna of an RFID tag is different than the operating frequency of the system (for example, at a tuned frequency of more or less than 13.56 MHz for a reader that operates at that frequency), the tag is less efficient in absorbing energy from the signal emitted by the RFID reader. The voltage induced into the tag is the greatest when the tuned frequency of the tag matches the frequency of the reader, and the induced voltage decreases as the difference between the inbound signal frequency and tuned frequency of a tag(s) increases. As the difference between the inbound signal frequency and the tuned frequency of a tag continues to increase, a point is reached at which the voltage induced in the tag is below that needed to power the tag. The next aspect of the present invention relates to solutions for tag-tag interaction problems.

One method of overcoming undesirable tag-tag interaction is to reduce the degree to which adjacent tags overlap each other. This can be done by systematically staggering the locations of RFID tags associated with file folders, documents, containers, or other items so that it is very unlikely that the tags on two adjacent items would overlap each other to any substantial degree. This may not eliminate the potential problem, but would substantially decrease it. The systematic staggering of tags could be done automatically by a machine that is adapted to position each tag at a position different from that of the last tag it applied to an item. It could also be done manually, perhaps in conjunction with a guide that shows the user where to position each tag. For example, if one tag is positioned at location A on an item, the guide (which is defined herein as a physical device, not a display of information on computer screen) may show positions A, B, C, D, and E so that the user can simply select the next successive position when applying a tag to the next item. It should be noted that incidental differences in the location of tags on items, such as may happen when tags are manually or automatically applied by a machine in only approximately the same location each time, are not considered to be staggered tags within the meaning of the present invention because incidental differences would not be sufficient to overcome the tag-tag interaction problems noted above.

Figure 3:
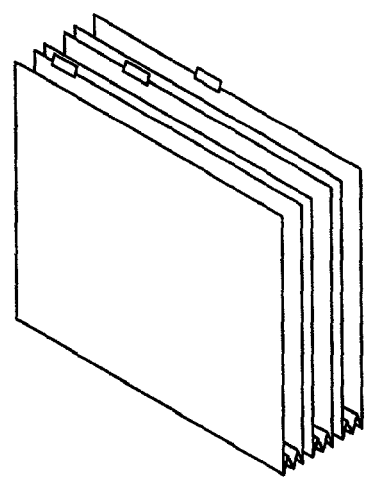
FIG. 3 is an elevated front perspective view of files marked with repositionable RFID tags in accordance with the present invention.

Another method of overcoming undesirable tag-tag interactions is to make the tag repositionable, so that a user who notes that the tag is located adjacent to another tag can move one or both tags to new locations on the items so that no significant interactions take place. This could be done by providing each RFID tag with a repositionable adhesive, such as those adhesives used on repositionable labels or paper notes generally, so that a tag adhered to an item can easily be removed and repositioned. Another similar method is to provide the RFID tag in or on a repositionable tab on the item, such as a file folder, so that the tab can be moved to a desired location, as shown in FIG. 3. These tags could be repositioned along the top, side, bottom, or other portion of the item to which they are attached.

Figure 4:
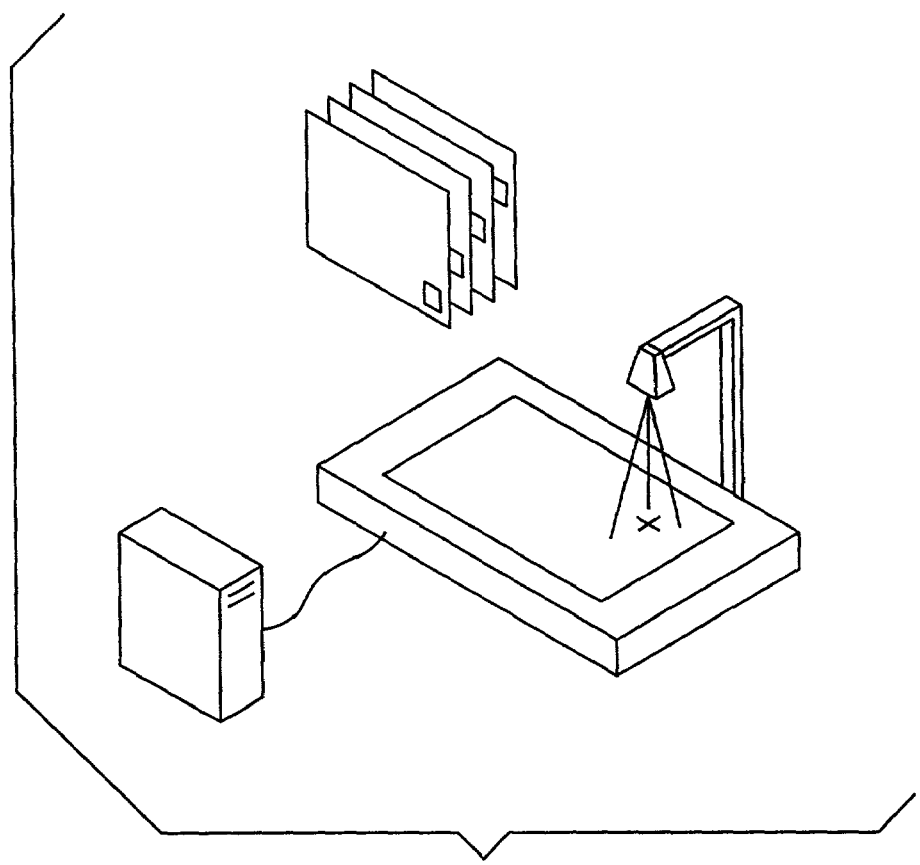
FIG. 4 is an elevated front perspective view of a device for calculating the desired position of an RFID tag on an item, and for projecting that location onto the item according to the present invention.

Alternatively, RFID tags can be staggered based on a database or other information. For example, the user could indicate which item was next to receive a tag. The system would look into a database of known records that are going to be filed nearby. Then, a non-overlapping position would be computed for the user to affix the tag. The calculated position could be displayed on a computer monitor, or directly on the file with a light beam or the like (as shown in FIG. 4), or the calculated position could be transmitted to a device that would automatically apply the tag in the appropriate location. In another embodiment, instead of determining the tag placement based on the filing order, the filing order could be based on the tag placement. That is, files could be placed on a shelf based on their tag locations, so that adjacent files do not have overlapping RFID tags. This may or may not be used in conjunction with a random filing system (in which files are not placed according to any specific filing system, such as a numeric or alphabetic system, and thus may be located anywhere in the storage area).

Figure 5:
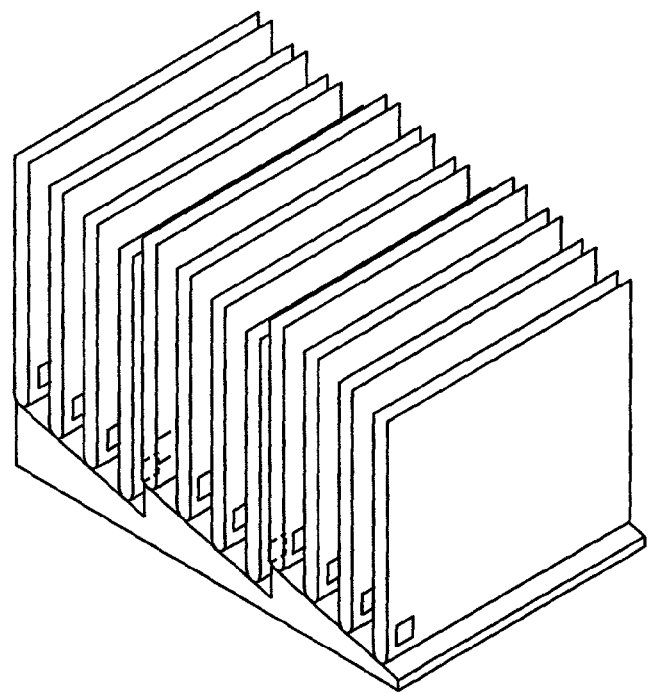
FIGS. 5 and 6 are elevated front perspective views of devices for staggering or spacing successive files to minimize tag-tag interactions, according to the present invention.

Items may also be arranged so that the tags are in essentially identical locations on each item, but the items are positioned at different positions relative to each other within the storage location. For example, in the case of files stored on a shelf, some type of structure that changes the shelf from a continuous flat surface to a surface having varying heights along its length could be used to offset adjacent items from each other. The shelf structures could be placed on the storage locations, or made integral with the storage locations, as desired. The structures may have, for example, a sawtooth profile, a ramp profile, an undulating profile, or other similar profiles that have the same effect, as shown in FIG. 5. Another alternative would be to position adjacent files, for example, at different distances from the front edge of the shelf, so that the RFID tags would then also be at different locations relative to each other. This could be done by providing shelf structures (or structures in storage locations generally) that only permit alternating items to be inserted a full distance into the storage location, which would provide for staggered locations of tags by virtue of the positions of adjacent items, and not the positions of the tags on the items.

Figure 6:
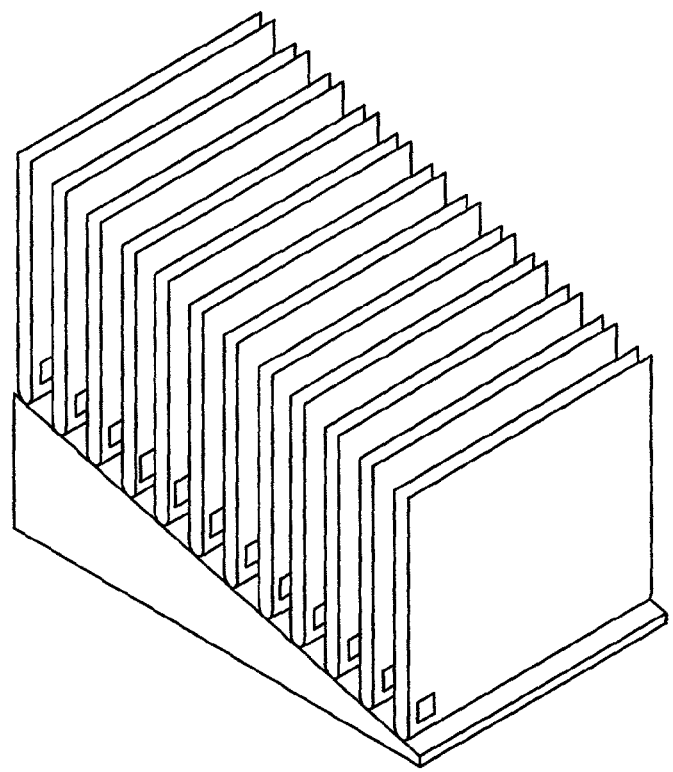
Figure 7:
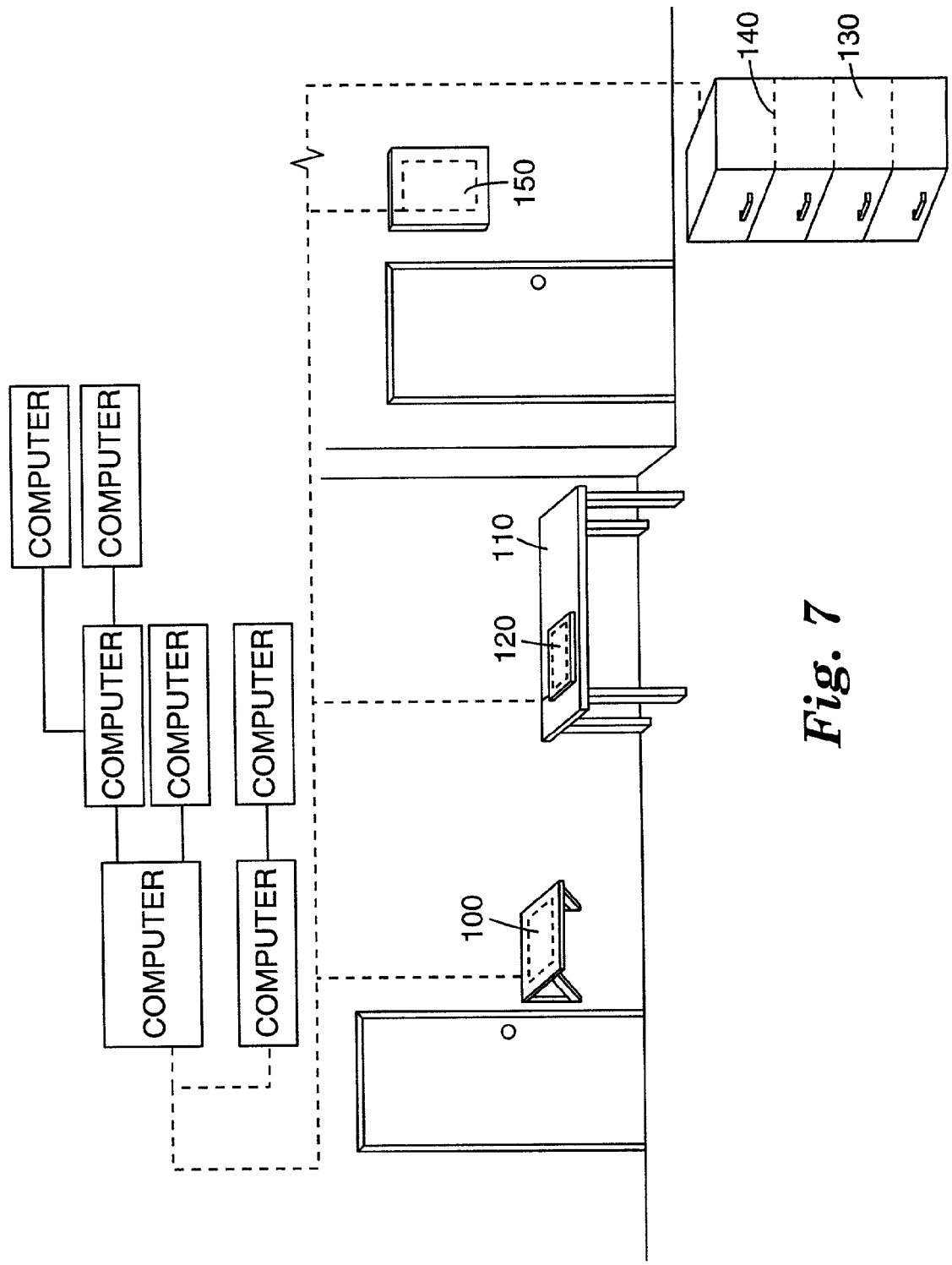
FIG. 7 is an illustration of the installation of the RFID system of the present invention in an office area, such as in a legal or medical facility, in which RFID reader pads are located at various positions at which files may be used by a user.

Another way to address the tag-tag interaction problem is to provide items or structures that provide for a specified minimum distance between adjacent tags. For example, each tagged item could include a bumper or structure (either added to the tagged item or formed in or on the tagged item) that prevents another item from being closer than the specified minimum distance. For example, a file folder may be embossed to provide such a bumper that projects from the remainder of the folder, so that the tag is essentially recessed relative to the bumper. Another way to do the same thing is to tag only items having a certain minimum thickness, such as file folders that are more than about 0.63 to 1.27 cm (0.25 to 0.5 inch) thick. Then if each item is tagged on the same surface, such as the left-hand side of the file folder, it would remain at least the specified distance away from each adjacent tag. This could be done in the case of file folders by providing a spacing strip within or outside the folder, in which the strip maintains the specified minimum thickness of the folder. Other similar embodiments may be used for items having different forms. In another "spacing" embodiment, a rigid portion could be built into the bottom of each folder to comprise part of the bottom and enforce the minimum width, yet allow the rest of the folder to expand as needed to accommodate a variable amount of folder contents. This is illustrated in FIG. 6. A tag could also be placed on or embedded in plastic and inserted along the spine of the folder or book, as shown in FIG. 7. In this tag placement configuration, tag to tag interaction is believed to be minimal, if any.

It is believed that the minimum separation distance between tags that interact with each other is proportional to the extent to which the tags overlap each other. That is, if two tags completely overlap each other, then the preferred minimum separation distance may be 0.63 to 1.25 cm (0.25 to 0.5 inches) or more, whereas if the tags only overlap slightly, then a lesser separation distance may still overcome the tag-tag interaction problem.

In another embodiment of a method and system for overcoming tag-tag interaction problems, applicants have determined that when adjacent RFID tags electromagnetically couple with each other, the effective resonant frequency of some of the tags is lower than each tag when measured separately. For example, RFID tags that are tuned to 13.56 MHz individually may, when positioned in parallel planes adjacent each other, have a range of effective resonant frequencies, most of which are lower than 13.56 MHz. This frequency shift may make it difficult for an RFID reader tuned to, for example, 13.56 MHz, to successfully interrogate all of the RFID tags. This determination has led to another embodiment of the present invention, which is described next.

In this embodiment, RFID tags are each individually tuned to a higher resonant frequency than the interrogation frequency of the RFID reader, so that when tag-tag interactions occur, the lower effective frequency of the adjacent tags is still within the range of frequencies within which a sufficient voltage to power the tag is induced into the tag. The tag then has energy to operate, and thus will be able to backscatter the received signal, modified with information supplied by the tag, thereby enabling successful interrogation of the tags by the RFID reader. For example, if the interrogation frequency of the RFID reader were 13.56 MHz, then the RFID tags could be tuned to 18.5 MHz, a frequency at which it has been found that a voltage sufficient to enable tag operation may still be induced into the tag, and be readable by an RFID reader operating at 13.56 MHz. If the 18.5 MHz tags were placed close together (as when files are tagged with RFID tags, but include no papers and are therefore quite thin), and overlapped or otherwise experienced tag-tag interactions that lowered the effective resonant frequency to something in the range of 13.5 MHz, then the RFID reader would still be able to interrogate those tags successfully. In other words, when two RFID tags tuned to a selected higher frequency or frequencies are positioned sufficiently close to each other, the effective resonating frequency of the tags is sufficiently close to the output frequency of the RFID reader that the RFID reader can interrogate the RFID tags successfully.

One method for tuning RFID tags to a different frequency is to adjust the number of turns on the tag loop antenna. This changes the antenna inductance. Because the tag capacitance is unaffected by this, the resonant frequency is changed. Usually the number of turns has to be decreased to increase the resonant frequency. Another technique for modifying the tag resonant frequency is to alter the capacitance. This can be done by adding an additional physical structure, such as printed parallel metal plates, to the tag antenna or modifying the on-chip capacitance at the input of the tag RFID integrated circuit. It is also possible to use a combination of these approaches. Those of ordinary skill in the art will appreciate the manners in which tags may be tuned.

It is believed that tags that couple with adjacent tags and exhibit an effective resonant frequency lower than the selected interrogation frequency of this example of 13.56 MHz, can still be interrogated successfully, so that 18.5 MHz tags that couple and have an effective frequency as low as approximately 11 MHz can still be interrogated by a 13.56 MHz RFID reader. The particular frequency of the reader, and the particular higher frequency to which tags are tuned, and the lower frequency at which tags respond depend on a number of factors including the frequency range at which the reader operates and the type and form of the RFID tag. Moreover, different test methods for determining the frequency to which an RFID tag has been tuned may produce different results, and accordingly it can be difficult to state with certainty that a particular tag has been tuned to, for example, 18.0, 18.5, or 19.0 MHz.

Tags tuned to a frequency different than the frequency of the RFID reader, as described immediately above, may be used in the tag staggering embodiments presented above provided that the coupling effect is still obtained, or in the other embodiments of the invention described herein. In other words, RFID tags may be staggered, tuned, or staggered and tuned, as desired.

One other embodiment of the present method of overcoming tag-tag interaction problems is to provide a tag that has antenna portions in two planes, and preferably two generally perpendicular planes. For example, a tag may be provided that can have one antenna portion along a vertical portion of a file folder, and a second antenna portion along the bottom, horizontal portion of the file folder. That way, even if the vertical portions of the tags overlapped, the horizontal portions would not, which would enable an RFID reader to successfully interrogate the tags.

In an additional embodiment of the invention, a set of RFID tags could be provided that would overcome tag-tag interaction difficulties, if each adjacent tag had a different shape (sometimes referred to as a "form factor") to minimize the extent to which adjacent tags would overlap each other when they were placed on files. For example, one tag could have an antenna circuit of a particular geometry, where its antenna geometry is different than the antenna geometry of adjacent tags, and each tag generally has a different antenna geometry from each other. In this way, the area of overlap of each tag could be reduced. Then, when such tags are placed on files adjacent each other, a majority of the antenna on one tag would not overlap the majority of an adjacent antenna, and thus tag-tag interaction problems would be minimized. Two or more tag designs could be provided or, to achieve the same end, alternating tags could be inverted or rotated to different degrees to provide the same effect.

II. RFID Tag That Can be Illuminated When Interrogated

As noted above, when conventional RFID tags are interrogated, they emit a response that can be detected by an RFID reader. Information regarding the item to which the tag is attached may then be displayed on a display associated with the RFID reader, or the RFID reader may emit a sound indicating that a tag has been interrogated.

In another aspect of the present invention, an RFID tag is provided that includes a light source that can be illuminated when the tag is interrogated. The light source could be an LED or other suitable source, and could be powered by a battery provided on the RFID tag (which would be referred to as an "active" tag), or by energy transmitted to the RFID tag by the RFID reader or another source (which would be referred to as a "passive" tag). When a user wishes to search for a specific item, the RFID reader can be programmed to emit a signal that instructs the RFID tag or tags that meet a certain description to respond by illuminating the light source, or returning an RFID signal to the RFID reader, or both. This visual indication makes the task of locating a specific item much easier, particularly if the item is stored with a large number of like items.

Another feature related to the one described just above is the illumination of a light source associated not with a specific item of interest, but instead with the items stored on either side of the item of interest. This could be useful when returning the item of interest to a storage location, and could be done by causing the RFID reader to emit a signal that instructs the tags known to be located on either side of the item of interest to be illuminated.

Items are often stored in storage locations in a predetermined order. For example, library materials are stored in a predetermined order, as are medical and other types of files. In another embodiment of the present invention, the light source described above could be illuminated when the position of the item to which it is attached does not correspond to its position in the desired order. In other words, items that have been mislocated could be illuminated, which would enable a user to obtain those files, determine their correct location (perhaps by interrogating the RFID tag again and obtaining its location either from information contained only on the tag, or from an existing database, or a combination of the two), and relocate them to their correct location. In a related embodiment, items that meet a certain description may be illuminated following interrogation, such as any items that are believed by an inventory control system to be missing or checked out, damaged, or eligible for archiving or disposal. For example, files that are believed to have been checked out of the file room, but are located by the RFID reader in the file room, may be illuminated in the manner described above to permit a user to find them easily.

Items are often stored together within a common container, and an RFID tag is associated with each of the items and with the common container. For example, a number of files may be tagged and stored within a larger accordion folder that also bears an RFID tag. These RFID tags may also include a light source of the type previously described, so that common containers that are missing one or more items may be located, or so that items that are mislocated within a common container may be located.

III. Smart Storage Areas and Systems

A smart storage area is one that is equipped with RFID interrogation capability so that it can read the RFID tags associated with the items stored in the storage area. One application of this aspect of the invention is for tracking and locating files or documents bearing RFID tags. A system of this type is illustrated in FIG. 1. Antennas are positioned on the shelves so that they can read the RFID tags associated with the files. The antennas may be positioned in various ways, such as on top or bottom of each shelf, at the back of the shelves, or supported vertically, interspersed among the files. The antennas can be retrofitted to existing shelves or built into a shelf and purchased as a unit.

The antenna or antennas associated with the storage area can interrogate, or poll, the RFID tags continuously in, for example, an area of the type shown in FIG. 1. If polling is done continuously, a controller (perhaps including a circuit for multiplexing signals through the antennas sequentially)

can cause the antennas to interrogate portions of the storage area in a predetermined order. The antenna system may include one or more nodes, i.e. subcontrollers, that control a subset of antennas. The number, location, and other characteristics of the antennas associated with a given node may be determined by the user. For example, if it is desired to poll the shelves quickly, more nodes may be added to the system. Another approach is for the user to configure or customize the polling system so that nodes or portions of the storage area may be configured to poll in a sequence specified by the user. For example, if one portion of the storage area is unavailable for use at certain times, then the RFID tags in that area need not be interrogated during those times.

A more sophisticated schedule for polling could involve interrogation of high-use or important areas more frequently than low-use or less important areas. Important areas may be areas in which items of high value are located, or areas in which theft or unauthorized acquisition of items is suspected, or areas where the transfer of items is more frequent than in other areas. This polling system can also be customized using software that enables the user to specify the frequency with which certain areas of the storage area are interrogated. For example, some areas (such as shelves in a file storage area) could be set up to poll the RFID tags only once or twice a day, or when there is known to have been activity in that portion of the storage area, while other areas could poll RFID tags more frequently. It should be noted that this embodiment of the invention relates to differential polling frequency, not simply changing the rate at which an area is polled (more or less quickly).

In another embodiment of the invention, an intermediate or master RFID tag may include information related to RFID tags in a local area. That information may be re-written periodically, so that the master RFID tag includes current information regarding the other RFID tags. The master RFID tag does not itself interrogate other tags, but instead serves as a local repository or database of information related to local RFID tags. Then, a fast inventory may be taken simply by interrogating only the master RFID tags.

In a related embodiment, a marker within a set of files (such as a vertical file separator) may include an RFID tag that includes information related to which RFID-tagged files should be adjacent that marker, or the correct order for the adjacent files based upon a known order. Then, as the number of files increases or decreases, the marker can be moved along the shelf, or to a different shelf. The RFID interrogation system (which may include an antenna fixed to, for example, the shelf in the manner described above, or may include a portable RFID reader) can interrogate the RFID-tagged marker as well as the RFID-tagged files. When the interrogation system learns information from the marker, such as which files should be adjacent that marker, it can then determine whether files not expected to be adjacent that marker have been found. When the interrogation system learns the location of the marker, it can then determine whether, for example, a file or set of files is located on the bottom shelf in one section of the storage area, or the top shelf in another section.

If a user is going or has recently been to an area to shelve or remove records, she may want that area to be immediately polled to update location information for those file locations. Then, instead of continuously polling all shelves, the system would focus on polling only the area of interest as specified by the user. This kind of event-driven polling may provide the advantage of faster updating for files of interest.

Even when a polling schedule has been set by a user, the system may permit that schedule to be altered either temporarily or permanently. For example, the storage area (such as a set of shelves for files) may include a button or display that enables a user to request more frequent polling or less frequent polling. This may be done in response to an increase in activity or a decrease in activity, and these requests for alteration of the polling schedule may in this manner preempt the standard polling schedule for a defined period of time (one hour, one day, or one week, for example), or simply alter the polling schedule for the future. The alteration of the polling schedule could even be automated. For example sensors, such as optical sensors, placed in or near a storage area to detect activity in that area, and the automated polling system could accordingly decrease, increase, or leave the polling schedule unchanged based on the activity level detected. For example, optical sensors may detect an increased number of people passing through a door into a room containing medical records, and if the number of people detected is more than 20% above a predetermined number, the sensor could send a signal to the controller and the controller could alter the polling schedule so that the monitored area is polled more frequently. There could even be a direct correlation between the activity level detected by the optical or other sensor and the polling frequency, so that a 15% decrease in traffic results in a 15% decrease in polling activity, and a 27% increase in traffic results in a 27% increase in polling activity. The correlation between detected traffic and polling frequency need not be exact, or even proportional, but may be approximate. Polling could also be activated when even a single access to a storage area is detected by a sensor.

In a related embodiment, a polling schedule may be altered based on information obtained from a database. That information may be simply how many items have been removed from or replaced in a particular storage area, or may reflect the proportion of file removals and replacements in a particular storage area relative to other storage areas. In another embodiment, polling may be increased in an area where one or more files have been checked out, until those files have been returned.

As an alternative (or supplement) to polling by taking a complete census of all tagged items, the system could instead detect changes in the presence or absence of items. For example, if the system database includes information regarding the current location status of all items, such as files, then the system may only need to track changes (removals, additions) to maintain accurate status information. This type of tracking system could be referred to as "differential polling," and may provide a performance advantage because the presence or absence of the tagged items can be determined by the database without a complete polling of all shelves. Periodic polling of the entire area may still be desirable to confirm the accuracy of the database, even when a differential polling system is used. As an example, a database may include the "circulation status" of various items such as books, files, or pallets, meaning that the database includes information indicating whether the item is supposed to be present in the storage area or not. Then, rather than polling every RFID tag in the entire storage area, the system may "instruct" each antenna or node to report back to the controller any items that are missing compared to the last time the area was polled, as opposed to reporting all items that are present. This may require memory associated with each antenna or node, but may result in a savings of time. A complete inventory may in any event be conducted at the end of each day, for example. In one particular embodiment, all information can be obtained from each antenna and node when the system is initialized, but only changes in that information communicated during subsequent interrogations of each antenna or node. This "differential polling" may be faster than polling every node and/or antenna, and equally effective.

A single file may be interrogated as it is removed from or replaced on a shelf. By keeping track of just those individual files that are being removed or added, the system can maintain an accurate inventory database. The removal or addition of items such as files may be detected by two or more sensors that when used together provide an indication of the direction that an item has moved, and can thus determine whether the item is entering or leaving the storage area. Another useful embodiment includes a user interface, which may include a button or display, such as a touch panel display, that a user uses to indicate whether an item is being added to or removed from the storage area. In another embodiment, an antenna in a particular portion of the storage area, such as a shelf, can be activated to interrogate the RFID-tagged items on that shelf to update the inventory database. It may be useful to provide some type of indicator (audio, visual, or both) that confirms for a user that an item has been removed or added to the storage area. This differential inventory system, and others of its kind described herein, differ from other differential inventory systems at least in that the removal or addition activity is detected at the storage location itself, and not at a check-in or check-out station when those transactions are typically recorded.

Another aspect of the present invention is that of masking RFID tags from interrogation while the items to which they are attached are in a stored position in a storage area, and unmasking the RFID tags when the items are removed from or added to the storage area. For example, tag-tag interaction could be maximized, rather than minimized, so that as long as files remain adjacent to each other, they cannot be interrogated. When files are removed or added, the RFID tags do not interact with each other, and the file being removed or added can be interrogated by an RFID reader antenna, such as an antenna shelf tape. In another embodiment, RFID tags could be shielded, or could be in contact with a metal shelf, so that the tags cannot be read in a stored position but can be read as they are being removed from or replaced on a shelf. Systems of this type may be much faster than standard RFID interrogation systems, because the RFID tags associated with most items cannot respond to interrogation, and only a selected few files that are being removed from or added to the storage area can be interrogated.

Another embodiment of the present invention includes a "verification marker" within a storage area. Using a shelf as an example, a verification marker may be placed at spaced intervals along the shelf, and interrogated by an interrogation system in the same manner as are other RFID-tagged items. The verification markers are not attached to items or assets for tracking purposes, but rather to enable a system to confirm proper operability, among other reasons. For example, if an interrogation system is unable to detect any RFID-tagged items on shelf J, that could be because no items are present, or because there is a malfunction in the interrogation system associated with that shelf. If, however, the system is able to detect the verification marker(s) associated with shelf J, then it can be assumed that the interrogation system is operating properly, and accordingly, that items that might be normally found on that shelf are not there. Another aspect of this method is that it enables the system to verify that the system has switched from one antenna (that detected one verification marker) to a second antenna (that detected a second verification marker), which is useful for embodiments in which the interrogation system multiplexes interrogation signals between or among multiple antennas in different storage areas.

Resolution of Position Within A Storage Area

For some applications it may be sufficient to know only whether a tagged item is within a storage area of interest. For other applications, however, it may be most useful to know not only whether an item is within a storage area of interest, but also where the item is located in absolute terms (perhaps by position within a bin or on a shelf), relative terms (relative to other tagged items), or both. For example, it may be useful to know that a file is in the middle quarter of the top shelf, that the file is between files labeled "Coyle" and "Coyne," or both.

One basic way of determining shelf position using fixed-position antennas (as opposed to a portable RFID reader with an antenna) is to place an antenna at each end of the shelf. If the antennas have ranges that overlap slightly, then if the antenna on the left end of the shelf detects the item, the item is known to be toward the left end of the shelf. The same principle applies on the right end of the shelf. If both antennae detect the item, then the item is known to be towards the center of the shelf. Greater resolution can be gained by adding additional antennas.

Another method of indicating position is to provide one or more light sources on or near the storage area, such as along the edge of a shelf. The light sources, which could be LEDs, could be used in conjunction with an antenna shelf tape of the type described in PCT Publication No. WO 00/10112, the contents of which is incorporated by reference herein. In that manner, when an antenna detects that an RFID tag of interest is near that antenna, a light source may be illuminated to attract the attention of a user to that portion of the storage area. The light source could also or instead be used for indicating that an item has been misplaced in the area of the light source. Antenna shelf tape, and the light sources described herein, can of course be used for other storage areas.

Another useful feature of the present invention is that of notification. Software associated with the smart storage area system can begin tracking the time from check-out of an item until check-in, and can issue a notification of overdue items. For example, if an item may only be checked out for 14 days, the software may begin a counter when the item is checked out, issue a notification to the user after 14 days, and issue a notification to a staff member after 21 days if the item has not been returned. The notification may be an e-mail message, a list, an audio alarm, or another suitable type of notification either to the person to whom the item was charged out, or to another interested person or system. This notification system could be completely automated, so that an e-mail message is sent automatically to the person to whom the item was charged out, or a computerized telephone call is placed to the person's telephone number. This has the advantage of reducing staff time associated with reminding people to return overdue files.

Other aspects of the notification feature include, for example, the notification of pending work for an individual or group based on the detection of items such as files in an area designated for review by that individual or group. This information could also simply be stored by a software program for future use. An example may be an area designated for upcoming matters for attorneys, such as a shelf or portion of a file cabinet, where files related to those matters may be placed in advance of their respective deadlines. FIG. 7 illustrates a simple embodiment of such a system, in which RFID interrogators are provided in shelves or reader pads so that files that are placed on a shelf 100 outside of an office, or a table 110 on a reader pad 120, or in a file cabinet 130 with a shelf 140 designated for pending matters, or near a door of a room into which the file will be taken (as with wall pad 150), or on desks (not shown) such as those located in offices or other work spaces. These readers can be networked with one or more computers so that individuals at various locations can access data in the system relative to those items. When an item is placed at a certain location for use by a certain person, the attorney (in this example) may then be notified that the file is ready for review. Naturally the same system could be applied to legal files stored in court rooms or court houses, and used by court personnel such as judges, clerks, and the like. Similarly, if patient files are located in a designated area, a medical professional may be notified (perhaps through a cellular telephone or a pager, or by e-mail) that the file (and perhaps the person to whom the file relates) is ready for review. The fact that the file was located on that shelf awaiting further processing can be recorded in a database, as part of a history of the location of that item. Note that a certain file located on a certain shelf or other storage location, on which a certain person is expected to work, is different than a storage room containing a large group of files (perhaps) awaiting work by any one within a group or organization. Stated differently, the certain shelf having a certain file for a certain person is specific to that person, whereas a general file room housing all files for all members of a group is not specific to anyone. Lastly, the notification system may notify a records system administrator when items that are indicated in a database as present are not detected during a polling cycle, so that the administrator may manually search for the file either in the storage area or elsewhere.

In another embodiment, a user can request a particular item or group of items, such as a file or a group of books. The smart storage system can then report to the user the last location at which the items were located within the storage area, and can as described above illuminate a light source associated with the item or the location, or both. Optionally, the system can re-poll the last-known location at which the item was detected to verify that the item is in the location indicated in the database.

Reading Information From and Writing Information To RFID Tags in Smart Storage Areas It is often advantageous to write certain data to tags so that those data can be accessed even when the reading device is not connected to a database and does not have access to a database. The smart storage areas and systems of the present invention may also be adapted to update or add to the information stored on the RFID tags. This is done by using the programming or "writing" capability associated with RFID readers, in conjunction with the antennas provided in the storage areas for communication with the RFID tags. This method is particularly useful when identical information is to be stored on a large number of RFID tags, because a person is not required to obtain all of the tagged items manually for individual processing. For example, if a records retention schedule is stored on the tag, that data could be automatically written to tags on or in the smart storage area as new retention dates are computed. Conversely, tag data can be read while in or on a smart storage area. A user may want to obtain specific information from the RFID tag associated with a particular item, such as a file, and can obtain those data via a computer interface to the smart storage area without having to locate the actual file. Reading and writing could occur from any place there is network access to the system. The mass update of files may be useful when, for example, a group of files will be transferred to a new location, or will be designated for archiving or destruction on the same date in the future. In these instances, software for mass updating of all the RFID tags (or the database entries associated with the respective RFID tags) can be activated by a user or automatically.

In another embodiment, smart storage areas such as smart shelves that are equipped with one or more antennas for interrogating the files on the shelves can determine which files are on the shelf or in the storage area, and then update a database to indicate information such as the time the file arrived, who the next person is who is supposed to work on the file, the next destination for the file, or other similar information. This information may be useful in tracking, for example, cycle time in processes, efficiency of one or more people who work with the files, and efficiency of the process. This information can also provide a type of location archive if the information is maintained within the software system. These smart shelves are provided at multiple locations (as opposed to in a single file room), and are networked with a computer to enable the system to determine where a file is located. These shelves are typically associated with a particular person or location, and thus may be referred to or considered to be "dedicated" shelves. As also described below, smart shelves could be located near individual offices or other areas in, for example, a hospital or clinic, a law firm, an accounting firm, a brokerage house, or a bank, to enable files to be tracked not only when they are located in a central file room, but also when they are located at a specific smart shelf.

IV. Portable RFID Readers

Portable RFID readers are disclosed in patent publications including U.S. Pat. No. 6,232,870, which is assigned to the assignee of the present invention and is incorporated by reference herein. One preferred embodiment of a portable RFID reader is a handheld reader of the type shown generally in FIG. 8, which includes an RFID reader, an antenna, a processor, a display, and a power supply. The display is part of a user interface that provides information to a user or receives information from a user, or both. The portable RFID reader typically also includes a system for communicating with a database, which may be a wireless communications system, or a removable media system in which information can be stored by the RFID reader to the removable media and the media then removed and used to upload information to or download information from a database associated with another computer. The communications system could also or instead include a wired (tethered) link for exchanging information. Another method of transferring information is to dock the RFID reader, or a portion of the reader (such as the computer and display, if those are provided as part of a handheld computer such as a Palm Pilot or HandEra (formerly referred to as the TRGPro), and then to update the databases in a manner commonly used in connection with handheld computers. Other details of the portable RFID reader are provided in the publication incorporated by reference above.

A portable RFID reader can be used in conjunction with a smart storage area. For example, a list of items that a user wishes to locate could be loaded into the portable RFID reader, along with the corresponding locations where those items are expected to be found based on the information obtained the last time that the RFID tags were polled. For example, a list of files and their locations may be loaded into the portable RFID reader. The portable reader can then guide the user (perhaps using graphics, words, or the like provided on the user interface) toward the location for the files that the user wishes to locate. A database associated with the portable RFID reader can indicate which items have been retrieved and which items have not yet been located. At the conclusion of a particular search, the user can easily produce a list of the items that haven't yet been retrieved by, for example, producing a report or viewing a list directly on the display of the portable device. The data can be transferred to the handheld devices by one or more of the communications links described above.

In another embodiment, a portable RFID reader such as a handheld RFID reader may be used to check items into and out of inventory. That is, the user may interrogate an RFID tag associated with an item, indicate through a user interface that the item is being checked into or out of inventory, as appropriate, and replace or remove the item, respectively. The updated inventory information may be stored on a database associated with the RFID reader, such as one stored in memory integral to the reader, or a removable data storage device, and that information can be uploaded to another computer as needed by one or more of the communications links described above.

A combination RFID/bar code system could also be used in the following manner. It may be desirable for a collection of barcoded items to be tracked using an RFID system. If the cost of the RFID tags or the cost of placing RFID tags on or in the items is not justified, then a group of barcoded items may be placed in a single container or in a storage area having one or more RFID tags, and the individual items can be associated with that tag or tags in a database. This can be done by scanning each barcode with a barcode scanner as the item is placed into the container or storage area. Then the items can be located in the container or in the storage area without the cost of converting each item to an RFID tagged-item. As the memory capacity of the integrated circuits associated with RFID tags increases, it may be feasible to associate the individual items with the tag or tags by writing the bar code numbers directly into the memory of the tag or tags.

V. RFID Readers

Some items such as files are difficult to track once they are taken from the main storage area. As illustrated in FIG. 9, for example, RFID readers can be placed throughout a facility to improve tracking and locating items of interest. Options for specific RFID reader designs include small shelves, such as those that could be located in an office, an in/out basket, a bin, a chart holder mounted to a wall, a file cabinet, or the like. Each such reader includes read and write capability as with the smart storage area. The readers could be designed to hold and store items, or as a simple pad on which a tagged item is temporarily placed until the RFID tag can be interrogated by the reader. RFID readers may also be mounted on a wall, or around part or all of a portal such as a door or a pass-through window.

Another feature of the invention is the ability to position an RFID reader in or near each of several areas to which a tagged item may be taken. For example, medical records may be tracked by placing an RFID reader in each clinic, doctor's office, reception area, and temporary file location(s). It may also be advantageous for these RFID readers to read stacked items, such as files, without having to position the items in a certain orientation, in part because users are more likely to use the system regularly if it is simple to use. One method of accomplishing this aspect of the invention is to place multiple antennas under, behind, next to, and/or above the area where the tagged items are going to be temporarily positioned. These antennas and the associated RFID reader(s) can be placed in as many or as few locations as the user desires.

When RFID readers are positioned in the manner described just above, the readers can act as automatic check-in and/or check-out devices. That is, the system may be configured so that whenever an item is detected by a particular RFID reader, that item is then checked out (meaning temporarily associated with a person, entity, or location, for example) to the person or location to which the RFID reader is associated. As noted above, if check-in and check-out procedures are both simple, accurate, and convenient (for example if an RFID reader is located near where items requiring a particular action are normally located, such as files that require dictation, transfer to another site, or are ready to be re-filed), user compliance is likely to increase.

In another aspect of the present invention, information related to the frequency of item movements can be used to improve planning. For example, information indicating the number of items moved to or from a particular area may be used to allocate personnel to areas with higher activity and away from areas with lower activity. Information of that kind may also be used to determine when to assign additional personnel to an area based on activity level. In the case of file management, if the system detects many more files being returned than normal, additional staff may be allocated to the file return area in time. That information may also be used to detect the activity levels of individual users or groups of users, and the person or group who maintain the item inventory (such as a file tracking database) can contact the users and perhaps customize the item management system to serve the frequent users more effectively. In another aspect of the invention, items indicated as having been checked in and checked out more frequently than other items may be made available to users on a different basis, such as electronically through a computer network, over an intranet or the Internet, or otherwise. Items indicated as having been checked in and checked out less frequently than other items may be scheduled for archiving or destruction, as appropriate. As described above, the system can send automatic notifications to the person or group to whom the item has been charged out, to the system administrators, or to another person or group.

Items such as files that are interrogated by RFID readers can improve work flow planning in other ways also. For example, a particular RFID reader may be associated with a storage area such as a bin or shelf that should be taken to a different storage location. By monitoring the activity and number of files detected by that particular RFID reader, the appropriate time to move the items may be scheduled most effectively.

Multiple RFID readers may be connected to a networked computer, or may be portable and then docked (as with a handheld computer or portable RFID reader) with a computer and the data exchanged (synchronized). Those readers could also be part of a centralized polling system, or each RFID reader could be connected to its own computer that is itself "polled" by another computer on demand. The multiple RFID readers could transfer information to a computer by a wireless network connection.

VI. Transporting RFID-Tagged Items

The present invention also includes within its scope a mobile smart storage area, such as a "smart cart" of the type shown in FIG. 10. For convenience, mobile smart storage areas will be referred to herein as smart carts, though they may take a different form than that illustrated or described. Each smart cart may itself have an RFID tag, or another identification means such as a wireless link, a cable (for hot-synching), or a user interface, which enables the cart and/or all of the items such as files on the cart to be checked in or checked out of inventory at one time. If the items are already associated with the cart (perhaps due to interrogation of the associated RFID tags either by an RFID cart reader, or by another portable RFID reader), then the task of interrogating each item individually can be eliminated and only an RFID tag associated with the cart, bin, or the like will be interrogated. This can be done with any of the smart storage areas or RFID readers described herein. Thus, an entire batch of files that have previously been associated with the storage area can quickly be transferred to a new location, or checked out to or in from a person. A smart storage area may also detect the presence of a mobile smart storage area, and provide an indication (such as activating a light source) of where to place certain tagged items within the smart storage area.

In another embodiment of the present invention, a group of RFID-tagged files may be transferred from one location to another location, as follows. First, the group of files may be collected. They may all relate to one or a group of people, clients, customers, or the like. An RFID reader is used to interrogate all of the files in the group, and the list of the interrogated files is then stored, preferably on a removable data storage device such as a compact-flash memory card, a computer diskette, a rewritable CD, or another non-volatile data storage device. The files may then be transferred to a new location, which can be one that is affiliated with the previous location (a different branch of a hospital (for patient files), or a bank (for customer or investor files), or a law office (for client files), for example), or may be one that is unaffiliated (such as a purchaser of a business, to which certain customer, client, or patient files relate). One specific example is the shipment of a group of medical files related to a group of soldiers, where a group of medical files may be sent along with a group of soldiers when they are deployed to a different location. The list of files interrogated at the prior location is sent to the recipient of the files, either on the data storage device or, preferably, by electronic mail (e-mail). The recipient of the files then interrogates all of the files that he or she received, and the RFID reader can compare the list of the files received to the list of the files sent, and report any discrepancies. In an additional embodiment of the invention, a discrepancy report (which can include items indicated as transferred but not received, or received but not transferred, or both) can be automatically sent by e-mail to the transferor of the files. From that discrepancy report, the transferor and the recipient of the files can determine whether any discrepancies exist, and how to resolve them.

VII. Computerization and Notification

In an additional embodiment of the invention, the RFID tracking and monitoring system of the present invention can be run in the background of a personal computer while a user is using the computer for another purpose. For example, a user may use a personal computer for word processing, or for working on the Internet, or for any other application that may be run on that computer, while an RFID asset tracking or monitoring system runs in the background without disturbing the user except under conditions selected by the user. Alternatively, the system may be instructed to notify the user under certain conditions, which may or may not be alterable by the user in the manner described below. Accordingly, in this embodiment of the invention, a system is arranged to permit the operation of a foreground program on a computer and to simultaneously run a background RFID program. "Simultaneous" operation includes a computer system that shifts quickly between the foreground program and the background RFID program in a manner that appears to a user as though only the foreground program is running. Software, and in particular RFID asset tracking software, can be designed to run an RFID program in the background, and can include instructions that enable the computer to provide a user interface that can be used to instruct the computer when a user should be notified that an asset has bee interrogated by an RFID reader. This background RFID processing is believed to be useful because RFID asset monitoring and other computer operations can be used on the same computer at the same time.

Systems are described above for tracking items tagged with RFID tags, in which the items (such as files or folders) can be interrogated by RFID readers associated with shelves, reader pads, handheld readers, and the like. The RFID reader interrogates an RFID tag and the information obtained, such as its identity and the location of the item, may be electronically recorded, but more can be done with the information obtained by this system. For example, when an RFID-tagged item is interrogated, notification can be provided to one or more system users in one of several ways. For example, a visual indication may be provided to a user of one or more personal computers associated with the RFID system, so that the user(s) of the computer(s) would see a dialogue window appear on a computer screen notifying the person using that computer that a file had been returned, for example. The dialogue window could be either one that disappears after a specified period of time, or one that preempts further activity by the user until the user takes a specified action, such as clicking on a button icon or the like. If a user does not wish to be disturbed by a "blast-through" visual message appearing on her computer screen, a more subtle visual indication such as changing an icon on the computer screen can be provided. For example, an icon in the taskbar tray area at an edge of the computer screen can change appearance (by, for example, changing color, shape, or the like) to notify a user that an RFID-tagged item has been interrogated. If the user activates the icon (by clicking, double-clicking, or "mousing over" an icon (positioning a cursor over an icon until some information appears), for example), then the icon can expand or otherwise show information related to the RFID-tagged item that was interrogated. Another form of notification is to enable the computer to play one or more sounds when an RFID-tagged item is interrogated, which can be useful not only to a person who is using the computer, but also to a person who is interrogating the item. In another embodiment, an icon or other visual notification, or a sound or other acoustic notification, could repeat until a user somehow confirms the notification through, for example, the personal computer.

These and other notification options can be controlled by a user through a user interface, such as the "Control Panel" section on a Windows user-interface associated with a personal computer. The user may instruct a computer to provide a notification only when a certain RFID-tagged item or class of items is interrogated, or when such an item or items is interrogated at a specified location, or when a specified user interrogates an item, or any combination of these and other events. A user could also indicate that she did not wish to be notified when certain items or classes of items were interrogated (typically but not necessarily when they are returned to a specified area), so that notification interruptions would be minimized for routine items, but provided for important items (both categories having been defined or confirmed by the user).

In another embodiment, the RFID system could, when a given RFID-tagged item has been interrogated (for example to check that item back into inventory), prevent anyone from checking that item back out of inventory. This could be useful when one person or group has an urgent need to review a file, for example, and wishes to place a hold on that file when it is next returned to a file room, smart shelf, or the like. In another embodiment, access to a personal computer by a certain person could be restricted until a specific RFID-tagged item is returned to a designated area, by causing the computer to check a database for "emergency-return" items and the name of the person to whom those items were checked out. This system would tend to insure prompt returns of RFID-tagged items.

Although the description provided in this Section VII has been exemplified by RFID-tagged files, the inventions described in this section could be used in conjunction with other RFID-tagged items, such as library books and materials, medical devices, pallets or storage containers, RFID-tagged vehicles, and the like.

We claim:

1. A method for interrogating a storage area that includes a number of items stored in the storage area each bearing an RFID tag, the method comprising:
   prior to initiating a polling of RFID tags within the storage area by an RFID interrogator having a plurality of antennas for communicating with the RFID tags wherein different portions of the storage area are associated with different antennas of the plurality of antennas to allow the RFID interrogator to selectively interrogate the different portions of the storage area, determining a number of people who have used each of the different portions of the storage area to access items stored in the different portions of the storage area; and
   after determining the number of people that have used the different portions of the storage area, controlling the RFID interrogator to poll at least some of the different portions of the storage area with antennas of the plurality of antennas associated with the different portions of the storage area more frequently than other portions of the storage area are polled by the RFID interrogator with antennas of the plurality of antennas associated with the other portions of the storage area, wherein the frequency of polling each of the different portions of the storage area depends on the determined number of people who have used the respective portion of the storage area to access items in that portion of the storage area.

2. The method of claim 1, wherein the method further includes controlling the RFID interrogator to automatically poll at least some of the different portions of the storage area with antennas of the plurality of antennas associated with the different portions of the storage area more frequently than the other portions of the storage area are polled by the RFID interrogator with antennas of the plurality of antennas associated with the other portions of the storage area based on information determined from polling.

3. The method of claim 2, wherein the frequency of the polling of each of the different portions of the storage area depends on the number of items that have been removed from or returned to the respective portion of the storage area.

4. The method of claim 1, further comprising detecting the number of people who have used the different portions of the storage area using an optical sensor.

5. A method for interrogating a storage area that includes a number of items each bearing an RFID tag, the method comprising the steps of:
   (a) providing a polling schedule for polling the RFID tags that designates the order in which different portions of the storage area are polled by an RFID interrogator coupled to a plurality of antennas for communicating with the RFID tags, wherein different portions of the storage area are associated with different antennas of the plurality of antennas to allow the RFID interrogator to selectively interrogate the different portions of the storage area;
   (b) prior to initiating polling the RFID tags, sensing activity within the storage area; and
   (c) preempting the polling schedule to cause the RFID interrogator to use antennas of the plurality of antennas to poll one of the different portions of the storage area associated with the antennas of the plurality of antennas in response to the sensed activity, prior to the RFID interrogator polling the RFID tags with the RFID interrogator using the plurality of antennas according to the polling schedule.

6. The method of claim 5, wherein sensing activity within the storage area comprises sensing activity within the storage area based on information obtained from a database.

7. The method of claim 5, wherein sensing activity within the storage area comprises sensing activity within the storage area using an optical sensor.

8. A method for interrogating a storage area that includes items each bearing an RFID tag, the method comprising the steps of:
   (a) providing a polling schedule for polling the RFID tags that designates the order in which portions of the storage area are polled by an RFID interrogator having a plurality of antennas for communicating with the RFID tags, wherein different portions of the storage area are associated with different antennas of the plurality of antennas to allow the RFID interrogator to selectively interrogate the different portions of the storage area; and
   (b) providing a user interface associated with the RFID polling system that enables a user to alter the polling schedule by increasing or decreasing the number of times that a portion of the storage area is polled by the RFID interrogator with antennas of the plurality of antennas associated with that portion of the storage area relative to the number of times that other portions of the storage area are polled by the RFID interrogator with antennas of the plurality of antennas associated with the other portions of the storage area.

9. An RFID polling system, comprising:
   (a) an antenna system for polling RFID tags associated with items stored in a storage areas, wherein the antenna system includes one or more RFID interrogators, each of the RFID interrogators having a plurality of antennas for communicating with the RFID tags, wherein different portions of the storage area are associated with different antennas of the plurality of antennas to allow the one or more RFID interrogators to selectively interrogate the different portions of the storage area;
   (b) a controller for controlling which of the plurality of antennas of the RFID interrogators are used for polling the portion(s) of the storage area;
   (c) a polling schedule that designates the order in which the portions of the storage area are polled by the one or more RFID interrogators using the plurality of antennas; and
   (d) a user interface associated with the RFID polling system that enables a user to alter the polling schedule by increasing or decreasing the number of times that a portion of the storage area is polled by the one or more RFID interrogators with antennas of the plurality of antennas associated with that portion of the storage area relative to the number of times that other portions of the storage area are polled by the one or more RFID interrogators with antennas of the plurality of antennas associated with the other portions of the storage area.

10. An RFID polling system, comprising:
    (a) an antenna system for polling RFID tags associated with items stored in a storage area, wherein the antenna system includes one or more RFID interrogators, each of the RFID interrogators having a plurality of antennas for communicating with the RFID tags, wherein different portions of the storage area are associated with different antennas of the plurality of antennas to allow the one or more RFID interrogators to selectively interrogate the different portions of the storage area;

(b) a controller for controlling which of the plurality of antennas are used by the RFID interrogators for polling the portion(s) of the storage area;

(c) a polling schedule that designates the order in which the portions of the storage area are polled by the one or more RFID interrogators using antennas of the plurality of antennas associated with the portions of the storage area; and (d) a detection system that detects activity in portions of the storage area prior to the one or more RFID interrogators initiating polling of the RFID tags with the antennas associated with the portions, whereby the polling schedule is altered based on information provided by the detection system regarding the detected activity that specifies an amount of activity within one or more portions of the storage area.

11. The polling system of claim 10, wherein the alteration in the polling schedule is proportional to the activity detected.

12. A method for polling RFID tags associated with items in a storage area, the method comprising the steps of:

(a) providing a polling schedule for polling the RFID tags that designates the order in which a plurality of different portions of the storage area are polled by an RFID interrogator coupled to a plurality of antennas for communicating with the RFID taps, wherein the different portions of the storage area are associated with different antennas of the plurality of antennas to allow the RFID interrogator to selectively interrogate the different portions of the storage area;

(b) prior to initiating polling the RFID tags, sensing activity within the storage area;

(c) preempting the polling schedule to cause the RFID interrogator to use antennas of the plurality of antennas to poll a different portion of the storage area associated with the antennas of the plurality of antennas in response to the sensed activity, prior to polling the RFID tags of the plurality of different portions of the storage area with the RFID interrogator using the plurality of antennas according to the polling schedule;

(d) polling the RFID tags with the RFID interrogator using the plurality of antennas in accordance with the polling schedule; (e) providing a database including information identifying the current location of each item within the storage area; and (f) updating the database using information from polling the storage area for items being removed or replaced.

13. The method of claim 12, wherein the RFID interrogator polls the entire storage area using the plurality of antennas periodically to obtain a census of every RFID-tagged item in the storage area.

* * * * *

UNITED STATES PATENT AND TRADEMARK OFFICE
CERTIFICATE OF CORRECTION

| | | |
|---|---|---|
| PATENT NO. | : 7,511,601 B2 | Page 1 of 1 |
| APPLICATION NO. | : 10/153124 | |
| DATED | : March 31, 2009 | |
| INVENTOR(S) | : Peter M Eisenberg | |

It is certified that error appears in the above-identified patent and that said Letters Patent is hereby corrected as shown below:

Column 24
Line 38, in Claim 9, delete "areas," and insert -- area, --, therefor.

Column 26
Line 1, in Claim 12, delete "taps," and insert -- tags --, therefor.

Signed and Sealed this
Sixteenth Day of August, 2011

David J. Kappos
*Director of the United States Patent and Trademark Office*